Patented Feb. 18, 1941

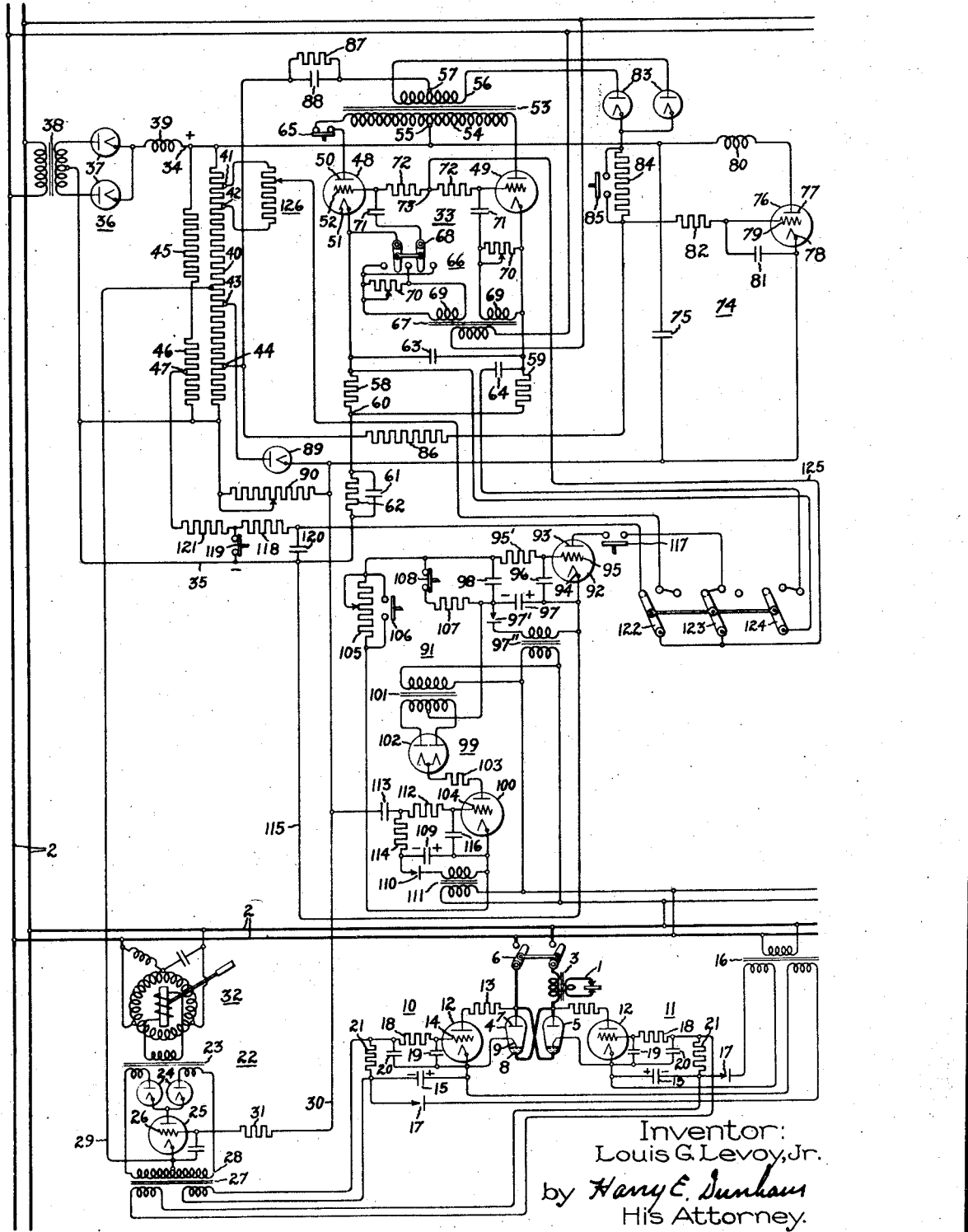

2,232,541

UNITED STATES PATENT OFFICE 2,232,541

ELECTRIC VALVE CIRCUIT

Louis G. Levoy, Jr., Schenectady, N. Y., assignor to General Electric Company, a corporation of New York Application March 31, 1938, Serial No. 199,156

11 Claims. (Cl. 250—27)

My invention relates to electric translating apparatus and more particularly to electric valve circuits.

In electric valve translating apparatus, it is frequently desirable to control the electric valves to effect periodic energization of an associated load circuit or to transmit a predetermined amount of energy to the load circuit during an accurately determinable interval of time. For example, in electric valve circuits employed in welding operations, it is desirable to use the same control circuits in spot welding, interrupted-spot and seam or line welding operations. In many of these electric valve welding systems, the control of the electric valves has been effected by use of an electric valve timing circuit which generates an electrical timing quantity such as a control voltage of predetermined periodicity or duration. The generating circuit may be of the type employing a source of direct current, a capacitance and an electric valve which discharges the capacitance which has been previously charged from the direct current source. The welding cycle, of course, is controllable by adjustment of the circuit constants. The magnitude of the control voltage is different for the different types of operation and for the different welding cycles. Where it is desirable to obtain uniformity of control without sacrificing flexibility, it has been found that it is important to provide a control circuit which effects the desired energization of the load circuit independently of the particular setting of the electric valve timing circuit. More particularly, in electric valve circuits intended for use in spot welding and interrupted-spot welding operations, it has been found feasible to employ as additional circuit, sometimes referred to as a lockout circuit, which renders ineffective or inoperative the timing circuit at the expiration of an accurately definable interval of time. It is important that this lockout circuit operate to effect this control irrespective of the magnitude of the control voltage produced by the timing circuit. There has been evidenced a decided need for improved circuits of this nature.

It is an object of my invention to provide a new and improved electric valve circuit.

It is another object of my invention to provide a new and improved electric valve circuit whereby timing intervals are accurately determinable and controllable.

It is a further object of my invention to provide a new and improved electric valve circuit for controlling electric translating apparatus whereby the period of energization of a load circuit is accurately controllable.

It is a still further object of my invention to provide a new and improved electric valve circuit for controlling electric translating apparatus in which a load circuit is periodically energized during a predetermined interval of time and in which the ratio of the intervals of energization to the intervals of deenergization is accurately controllable.

In accordance with the illustrated embodiment of my invention, I provide an improved electric valve circuit particularly adaptable for use in connection with electric valve translating apparatus for welding operations, such as spot welding, interrupted-spot and seam welding operations. Electric valve apparatus is connected between an alternating current supply circuit and the welding circuit to transmit current thereto. An electric circuit is employed for producing a timing quantity, such as an impulse of voltage or a periodic voltage, to control the electric valve apparatus to effect a single energization of the welding circuit or to effect a predetermined number of consecutive energizations of the welding circuit. The single energization or the consecutive energizations of the load circuit may each correspond to a fraction of a half cycle of voltage of the associated alternating current supply circuit, or may correspond to a complete half cycle of the voltage of the alternating current supply circuit, or may correspond to a predetermined number of such whole or fractional half cycles. The timing circuit comprises electric discharge devices which determine the time of initiation of the control voltage and determines the ratio of the interval of conduction to the interval of nonconduction of the electric valve apparatus. In order to assure a single energization of the load circuit or a predetermined number of consecutive energizations of the load circuit during an interval of time, I provide a lockout circuit for the timing circuit which impresses a negative voltage on a control member of one or more of the electric discharge devices in the timing circuit at the expiration of the desired interval. This lockout circuit comprises an electric discharge device having a control member. The electric discharge device in the lockout circuit is arranged to impress a negative unidirectional biasing potential on the control member of one or more of the electric discharge devices in the timing circuit. I provide a control circuit for energizing the control member of the electric discharge device in the lockout circuit. This control circuit comprises means for impressing on the control member a negative unidirectional biasing potential tending to maintain the discharge device nonconductive and includes an additional circuit which operates independently of the magnitude of the control voltage produced by the timing circuit to control accurately the time at which the electric discharge device in the lockout circuit is rendered conductive. This latter circuit comprises a serially connected capacitance, a rectifier which is energized from the alternating current supply circuit, and a controlled electric valve which is energized in response to the control voltage produced by the timing circuit. A variable impedance element is connected in series relation with the capacitance, the rectifier and the controlled electric valve to control the rate at which the charge is established on the capacitance and hence to control the timing interval. Since the rectifier is energized from the alternating current circuit, the incremental charge established on the capacitance is independent of the magnitude of the periodic quantity generated by the timing circuit, permitting a precise control of the timing interval.

For a better understanding of my invention, reference may be had to the following description taken in connection with the accompanying drawing, and its scope will be pointed out in the appended claims. The single figure of the accompanying drawing diagrammatically illustrates an embodiment of my invention as applied to an electric valve welding circuit.

Referring now to the single figure of the drawing, I have there diagrammatically illustrated my invention as applied to an electric circuit for effecting energization of a welding circuit 1 from an alternating current supply circuit 2, through a transformer 3 and electric valve means 4 and 5. A suitable circuit controlling means, such as a switch 6, may be connected in series relation with the transformer 3 and the electric valves 4 and 5. The electric valves 4 and 5 may be of the type employing an ionizable medium, such as a gas or a vapor, and each comprises an anode 7, a cathode 8 which may be of the self-reconstructing type such as mercury, and an associated control member 9 of the make-alive or immersion-igniter type comprising a material having a relatively high specific electrical resistivity, such as boron-carbide or silicon-carbide.

I employ excitation circuits 10 and 11 which are associated with electric valves 4 and 5, respectively, and which serve to effect energization of the immersion-igniter control members 9. Each of the excitation circuits 10 and 11 includes a control electric valve 12 which is connected between the anode 7 of the associated valve and the immersion-igniter control member 9, through a current limiting resistance 13. The electric valves 12 are preferably of the type employing an ionizable medium and each comprises a control member 14. In order to impress on the control members 14 a negative unidirectional biasing potential which tends to maintain the electric valves nonconductive except during those intervals when it is desired to ignite the electric valves 4 and 5, I employ capacitances 15 which are charged to the polarity indicated by means of a transformer 16 which is energized from the alternating current circuit 2 and by means of unidirectional conducting devices 17 which are connected in series relation with secondary windings of transformer 16 and the associated capacitances 15. Current limiting resistances 18 are connected in series relation with the control members 14, and capacitances 19 are connected across control members 14 and the associated cathodes of electric valves 12 to absorb extraneous transient voltages which may be present in the control circuit or in the excitation circuits 10 and 11. Capacitances 20 may be connected across the cathodes and the resistances 18 to act as an additional filtering means. To introduce into the excitation circuits 10 and 11 voltages sufficient to overcome the effect of the negative unidirectional biasing potentials and to render the control valves 12 conductive and hence to render electric valves 4 and 5 conductive, I employ impedance elements, such as resistances 21. These resistances are connected in series relation with the respective associated capacitances 15 and resistances 18.

I employ a circuit 22 for generating a voltage of peaked wave form to effect the desired energization of the resistances 21 in excitation circuits 10 and 11. The voltage appearing across the terminals of resistances 21 in response to the energization provided by circuit 22 is, of course, of peaked wave form, effecting precise control of electric valves 12. The circuit 22 is disclosed and claimed in a copending patent application Serial No. 138,809 of Harold W. Lord, filed April 24, 1937, and assigned to the assignee of the present application. The circuit 22 comprises a transformer 23 which is preferably of the type designed to provide a voltage of peaked wave form and may be of the self-saturating type. The circuit also includes a pair of unidirectional conducting devices 24 which are connected in series relation with an electric discharge device 25 of the controlled type including a control member 26. The unidirectional conducting devices 24 and the electric discharge device 25 act in series relation to transmit current to primary winding 28 of transformer 27. Due to the fact that the voltages induced in the secondary windings of transformer 23 are of peaked wave form, the controlled electric discharge device 25 is effective to control the number of half cycles of current transmitted to the transformer 27 in accordance with the control potential appearing across the conductors 29 and 30 which constitute a control circuit. A current limiting resistance 31 may be connected in series relation with control member 26 of the discharge device 25. As a means for controlling the amount of energy transmitted to load circuit 1 during the intervals of time established by the timing circuits described hereinafter, a phase shifting device, such as a rotary phase shifter 32, may be interposed between the alternating current supply circuit 2 and the primary winding of transformer 23. By adjustment of the rotary phase shifter 32, the time of starting of the electric valves 4 and 5 during the positive half cycles of applied anode-cathode voltage is controllable.

I employ a polarity selector and a wave selector 33 which control the time of initiation of electric discharges in the electric valves 4 and 5. The polarity selector 33 may be of the type disclosed and claimed in a copending application Serial No. 146,019 of Harold W. Lord, filed June 2, 1937, and assigned to the assignee of the present application. The polarity selector 33 makes it possible to initiate consecutive energizations of the load circuit 1 during half cycles of voltage of the same polarity or during half cycles of opposite polarity. The polarity selector 33 may comprise a source of direct current including conductors 34 and 35. As a means of generating the unidirectional voltage, I employ a full wave rectifier 36 including a pair of unidirectional conducting devices such as electric valves 37, a transformer 38 and a smoothing reactance 39. A voltage divider is connected across the conductors 34 and 35 and comprises a resistance 40 having intermediate terminals 41—44. A second voltage divider may also be connected across the conductors 34 and 35 and may comprise serially connected resistances 45 and 46, the latter being provided with an intermediate terminal 47.

Polarity selector 33 includes a pair of electric discharge devices 48 and 49 which are preferably of the type employing an ionizable medium and each comprises an anode 50, a cathode 51 and a control member 52. The electric discharge devices 48 and 49 are connected in and comprise a part of two parallel paths, one of which is always conducting. A transformer 53 having a primary winding 54 provided with an electrical intermediate connection 55 and a secondary winding 56 provided with an electrical intermediate connection 57, is employed to produce a control voltage when a nonconducting discharge device of the discharge devices 48 and 49 is rendered conductive. The intermediate connection 55 of primary winding 54 is connected to the positive conductor 34. Resistances 58 and 59 are connected in series relation with electric discharge devices 48 and 49, respectively, and are connected at a common point 60, completing the parallel paths of the polarity selector. Point 60 is connected to the negative terminal of the direct current source through a parallel connected capacitance 61 and a resistance 62 which serve as a means for producing an additional biasing voltage in circuit 33. As a commutating means for the electric discharge devices 48 and 49, I employ capacitances 63 and 64, the former being permanently connected across the parallel paths and the latter being arranged to be selectively connected across or disconnected from the parallel paths.

A contactor 65 may be connected in series relation with one of the electric discharge devices 48 or 49, such as discharge device 48 to start the circuit in the event the circuit fails to commutate when operation is initiated.

As a means for controlling the electric discharge devices 48 and 49 for uni-polar or antipolar starting, that is, to control the times of initiation of the electrical impulses so that consecutive energizations of the load circuit 1 occur during half cycles of the same or opposite polarities of the voltage of supply circuit 2, I employ an excitation circuit 66 and this circuit includes a transformer 67 and a switch 68 which in the right-hand position initiates consecutive impulses which occur during half cycles of voltage of like polarity of circuit 2 and which in the left-hand position generate consecutive impulses which occur during half cycles of opposite polarity of the voltage of circuit 2. Secondary windings 69 of transformer 67 are shunted by adjustable resistances 70 and capacitances 71 are connected in series relation with the control members 52 of the electric discharge devices 48 and 49. To impress unidirectional potentials on the control members 52 of the discharge devices 48 and 49, I employ a voltage divider comprising a pair of resistances 72 having a common juncture 73 thereof connected to a negative potential through apparatus described hereinafter.

As a means for controlling the ratio of the intervals of conduction to the intervals of nonconduction of the electric valves 4 and 5, or in other words as an agency for controlling the welding cycle, or to control the interval of a single energization, I employ a circuit 74 which is responsive to the electrical impulse generated by the polarity selector 33. This feature of employing two electric circuits, one for controlling the time at which the energizations of the welding circuit begin and the other for controlling the welding cycle, is disclosed and broadly claimed in a joint patent application Serial No. 146,020 of Louis G. Levoy, Jr. and G. W. Garman, filed June 2, 1937, Patent No. 2,166,305, dated July 18, 1939, and assigned to the assignee of the present application. The circuit 74 is also energized from the direct current source including conductors 34 and 35, and includes a capacitance 75 which is energized therefrom. An electric valve 76, which is preferably of the type employing an ionizable medium, periodically discharges the capacitance 75 to generate a second timing quantity. The electric valve 76 includes an anode 77, a cathode 78 and a control member 79. An inductance 80 may be connected in series relation with the electric valve 76 to assist in rendering the electric valve nonconductive. A capacitance 81 may be connected across the cathode 78 and the control member 79 to absorb extraneous transient voltages; and a current limiting resistance 82 may be connected in series relation with the control member 79. The electric valve 76 is rendered conductive by means of the electrical quantity or control voltage generated by the polarity selector 33. The output voltage of transformer 53 appearing across the terminals of secondary winding 56 is rectified by means of a pair of unidirectional conducting devices, such as electric valves 83, and the unidirectional current is transmitted through a suitable impedance element such as a resistance 84. A suitable controlling means, such as a contactor 85, may be connected across the terminals of the resistance 84 to increase the voltage impressed on the control member 79 of electric valve 76. A resistance 86 is connected in series relation with resistance 84 and the left-hand terminal of the resistance 86 is connected to the intermediate connection 44 of resistance 40 in the voltage divider. A parallel connected resistance 87 and a capacitance 88 are employed to control the voltage impressed on the control member 79 of the electric valve 76 so that the control voltage is of peaked wave form. A unidirectional conducting device, such as an electric valve 89, is connected between cathode 78 of electric valve 76 and intermediate connection 43 of resistance 40. Electric valve 89 serves to limit the maximum voltage and charge of capacitance 75, and thereby make the charge on capacitance 75 substantially independent of time after valve 89 becomes conducting. These features are disclosed and claimed in my copending patent application Serial No. 146,021 filed June 2, 1937, Patent No. 2,166,306, dated July 18, 1939, and assigned to the assignee of the present application.

An adjustable resistance 90 is connected in series relation with the electric valve 76 and the negative terminal of the direct current source including conductors 35 and 34. This element serves to control the ratio of the intervals of conduction to the intervals of nonconduction of 75 the electric valves 4 and 5 where the system is operating to effect a predetermined number of consecutive energizations of the load circuit 1 from the supply circuit 2. Where the system is operating to effect only a single energization of the load circuit 1, such as during spot welding operations, the resistance 90 is a means for adjusting the period of energization of the load circuit 1.

I provide a lockout circuit 91 which is arranged to impress a negative potential at point 73 in the polarity selector circuit to maintain the then nonconducting valve in a nonconducting condition so that the interval of energization of the load circuit 1 is accurately determinable or so that the number of energizations of the load circuit 1 is accurately determinable. The lockout circuit 91 includes an electric discharge device 92 which is preferably of the type employing an ionizable medium, such as a gas or a vapor, and comprises an anode 93, a cathode 94, and a control member 95. A current limiting resistance 95' is connected in series relation with the control member 95. A capacitance 96 may be connected across the control member 95 and the cathode 94 to absorb transient voltages. A capacitance 97 impresses a negative unidirectional biasing potential on the control member 95 tending to maintain the electric discharge device 92 in a nonconducting condition, and the capacitance 97 is charged to the polarity indicated by means of a unidirectional conducting device 97' and transformer 97" which is energized from the alternating current circuit 2. In order to render the electric discharge device 92 conductive at the expiration of a precisely determinable interval of time, I provide a circuit which is energized from a source of alternating current and may include a serially connected capacitance 98, a rectifier 99 and a controlled electric valve 100. The rectifier 99 is energized from the alternating current circuit 2 and comprises a transformer 101 and may comprise a full wave rectifying valve 102. A current limiting resistance 103 is connected in series relation with the electric valve 100. Electric valve 100 is preferably of the type employing an ionizable medium and includes a control member 104.

I provide a suitable adjustable impedance, such as an adjustable resistance 105, which is connected in series relation with the capacitance 98, the rectifier 99, and electric valve 100 to control the rate at which the capacitance 98 is charged and hence to control the time interval at which the electric discharge device 92 is rendered conductive. A suitable controlling means, such as a contactor 106, may be connected across the terminals of the resistance 105 and may be arranged to be closed when it is desired to effect only a single energization of the welding circuit 1. A discharge circuit including a resistance 107 and a contactor 108 is provided for the capacitance 98 to serve as a means for resetting the lockout circuit. The contactor 108 may be arranged to be normally biased to the closed circuit position and the contactor 106 may be normally biased to the open circuit position.

In the event it is desired to use the circuit 33 for only unipolar starting and where it is desired to transmit only an even number of impulses of current to the load circuit 1, the capacitance 98 may be charged from the alternating current circuit 2 directly through the controlled electric valve 100, thereby dispensing with the necessity for the rectifier 99. When the lockout circuit 91 is so arranged, the electric valve 100 transmits half cycles of current to the capacitance 98 from circuit 2 through the resistance 105. Of course, with this arrangement the circuit 91 accurately determines the period of energization of the load circuit 1 by transmitting current during only half cycles of one polarity of the alternating current circuit 2.

To impress on the control member 104 of the electric valve 100 a negative unidirectional biasing potential tending to maintain this valve in a nonconducting condition, I provide a capacitance 109 which is charged to the polarity indicated by a unidirectional conducting device 110 and a transformer 111 which is connected to the alternating current circuit 2. A current limiting resistance 112 is provided in series relation with control member 104. The electric valve 100 is rendered conductive in response to a predetermined controlling influence such as the timing voltage generated by the circuit 74, and the control member 104 is connected to conductor 30 through a capacitance 113. The output voltage of the circuit 74 is impressed on the control member 104 through a circuit including the capacitance 113 and an impedance element such as a resistance 114 which is connected in series relation with capacitance 113. The cathode 94 of the electric discharge device 92 is connected to the negative conductor 35 of the direct current source through a conductor 115. Capacitance 116 is connected across control member 104 and cathode of electric valve 100 to absorb transient voltages.

As a means for selectively disconnecting and connecting the electric discharge device 92 in circuit with the control members 52 of electric discharge devices 48 and 49, I provide a suitable circuit controlling means such as a switch or contactor 117. The contactor 117 also serves to render the electric discharge device 92 nonconductive by opening the anode-cathode circuit. As an additional means for rendering the discharge device 92 nonconductive, I provide a circuit including a resistance 118 and a contactor 119 which in conjunction with the switch 117 serve to close a circuit across the anode and cathode of the electric discharge device 92. A capacitance 120 is connected in series relation with resistance 118 to serve as a means for absorbing transients occasioned by the opening and closing of contactor 119. A resistance 121 is connected in series relation with resistance 118 and is connected to intermediate connection 47 of resistance 46.

I provide switches 122, 123 and 124 for controlling or presetting the control system so that the load circuit 1 may be energized in a variety of different ways. For example, the switches 121—123 are arranged to have three separate positions, each corresponding to a different type of energization of the load circuit 1. In the left-hand position, the switches are arranged to effect energization of the load circuit 1 during a single interval of time; in the intermediate position the switches control the system to effect a predetermined consecutive number of energizations of the load circuit 1; and in the right-hand position the switches control the system to effect an indefinite number of periodic energizations of the load circuit. It is to be understood that each of these energizations may comprise a fraction of a single half cycle of current, a complete half cycle of current, or a predetermined number of complete or fractional half cycles of current. Switches 122—124 may be arranged to be operated simultaneously or may be arranged to operate in a desired sequence. In the arrangement shown in the drawing, the switches are represented as being mechanically coupled and are arranged to be operated simultaneously. The movable elements of switches 122 and 123 are connected to point 73 in the polarity selector circuit 33 through a conductor 125. Switch 122, when in the left-hand position, connects point 73 in the polarity selector circuit 33 to intermediate connection 47 of resistance 46 through resistances 118 and 121. Of course, when the contactor 119 is closed, point 73 is also connected to the negative conductor 35 of the direct current source. Switch 122, when in the intermediate and right-hand positions, connects point 73 to a voltage divider 126 which in turn is connected across intermediate connections 41 and 42 of resistance 40. The voltage divider 126 serves as a means for controlling the welding cycle, or, in other words, as a means for controlling the sum of the intervals of conduction and the intervals of nonconduction of the electric valves 4 and 5 when the system is performing interrupted-spot and seam welding operations. Switch 123, when in the left-hand and intermediate positions, presets the circuit for spot welding and interrupted-spot welding operations and when the contactor 117 is in the closed circuit position connects points 73 to the negative conductor 35 of the direct current source through electric discharge device 92. Switch 124, when in the intermediate and right-hand positions, connects the additional commutating capacitance 64 across the parallel paths of the polarity selector 33.

It is to be noted that the electric discharge device 92 is connected in circuit only for the spot welding and the interrupted-spot welding operations, and that this element is not employed where it is desired to use the system for seam welding. The contactors 108 and 119 may be arranged to be opened simultaneously by a control switch or other suitable means to place the circuit in condition for spot and interrupted-spot welding operations. Furthermore, the contactor 117 may be arranged to be closed simultaneously with the opening of contactors 108 and 119. As a further matter, it is to be understood that the contactor 85 may be closed simultaneously with the operation of contactors 108, 117 and 119. These controls may be effected by the usual devices employing control switches and electromagnetic devices.

The operation of the embodiment of my invention shown in the single figure of the drawing will be explained by considering the system when it is desired to effect energization of the load circuit 1 from the alternating current circuit 2 through the electric valves 4 and 5. Of course, the switch 6 is moved to the closed circuit position. The electric valves 4 and 5 conduct current to energize transformer 3. The amount of energy transmitted to the load circuit 1 depends upon the time during the positive half cycles of applied anode-cathode voltage at which the electric valves are rendered conductive. The amount of energy transmitted to the load circuit 1 is maximum when the electric valves are rendered conductive at a point during the positive half cycles of applied anode-cathode voltage corresponding to the power-factor angle of the load circuit, and the amount of energy transmitted to the circuit 1 decreases as the valves are rendered conductive at later points in the positive half cycles. Control electric valves 12 are rendered conductive to energize the immersion-igniter control members 9 of electric valves 4 and 5 during predetermined intervals established by the control system, the positive impulses of voltage for igniting the valves 12 being provided by the circuit 22 and are introduced into excitation circuits 10 and 11 by resistances 21.

The circuit 22 transmits a predetermined number of impulses of voltage of peaked wave form depending upon the periodic voltage impressed across the control member 26 and the cathode of the electric discharge device 25 by means of conductors 29 and 30. The phase of the peaks of voltage produced by circuit 22 relative to the voltage of circuit 2 is controllable by the positioning of the rotary phase shifter 32, thereby providing a suitable means for controlling the time of energization of the immersion-igniter control members 9 during the positive half cycles of voltage applied to the anodes 7 of electric valves 4 and 5. In other words, circuit 22 controls the amount of energy transmitted to the load circuit 1 during the intervals of time established by the timing circuits.

The polarity selector or wave selector 33 controls the time of the initiation of the periodic control voltage and hence controls the time of initiation of the arc discharges within electric valves 4 and 5. In welding circuits it is frequently desirable to begin consecutive or succeeding energizations of the load circuit during half cycles of voltage of opposite polarity to avoid a saturation condition of the associated transformer apparatus so that the load current, or the current transmitted by the electric valves, does not exceed a safe operating range. When the switch 68 of the polarity selector 33 is in the left-hand position, the circuit is arranged so that consecutive impulses of the timing voltage are commenced or initiated during half cycles of voltage of opposite polarity of the alternating current source 2. The parallel paths of the polarity selector 33, each of which includes one of the electric discharge devices 48 and 49, are arranged so that one of the paths is always conducting and is arranged so that the control voltage is initiated when a nonconducting electric discharge means is rendered conductive. When the switch 68 is in the right-hand position, the consecutive impulses of voltage generated by the polarity selector 33 are initiated during half cycles of voltage of like polarity of circuit 2.

Of course, it is to be understood that when the system is operating to transmit a predetermined number of impulses of the timing voltage, the circuit 33 controls the periodicity of these impulses and the circuit 74 controls the ratio of the intervals of conduction to the intervals of nonconduction of the electric discharge device 25, and thereby controls the ratio of the intervals of conduction to the interval of nonconduction of the electric valves 4 and 5. This condition of operation, of course, corresponds to the interrupted-spot welding operation. When the system is employed for spot welding, the polarity selector 33 controls the time of initiation of the periodic timing voltage produced by circuit 74, and the circuit 74 controls the actual interval of conduction of the electric discharge device 25 in circuit 22 and thereby controls the period of energization of the load circuit 1. The amount of energy transmitted during the respective intervals of conduction is controlled by adjustment of the rotary phase shifter 32 in circuit 22.

The circuit 74, which generates a periodic voltage, or a single impulse of voltage, or a predetermined number of impulses of voltage, depending upon the setting of switches 122—124, impresses these control voltages on control member 26 of electric discharge device 25 through conductors 29 and 30. The duration, period or periodicity of the single impulse or the number of impulses generated by circuit 74 is different from the period or periodicity of the supply circuit 2.

The lockout circuit 91, which is effectively connected in circuit for the spot welding and interrupted-spot welding operations, serves to effect energization of the load circuit 1 during accurately determinable intervals of time and effects this control by impressing a negative potential on point 73 in the polarity selector circuit 33 at the expiration of such interval of time. The manner in which this lockout circuit 91 functions may be explained by considering the system when it is arranged for spot welding operation, that is, when the system is arranged to effect a single energization of the load circuit 1. This single energization of the load circuit 1 may correspond to a fractional half cycle of voltage of the supply circuit 2, or may correspond to a complete half cycle of voltage of the supply circuit 2, or may correspond to a predetermined number of complete or fractional half cycles of voltage of the supply circuit 2. Let it be assumed that the switches 122—124 are in the position indicated in the drawing, that is, in the spot welding preset position. To place the system in condition for operation, contactor 108 is moved to the open circuit position, contactors 85, 106 and 117 are moved to the closed circuit positions and contactor 119 is opened to initiate the welding operation. If the switch 68 is in the left-hand position so that the circuit is arranged for antipolar starting, circuit 33 will operate to produce an impulse of voltage during a half cycle of voltage of circuit 2 of the proper polarity, and the voltage appearing across the resistance 84 will be of sufficient magnitude to render electric valve 76 conductive. Upon being rendered conductive, the capacitance 75 will discharge through electric valve 76 to produce an impulse of voltage which will render electric valve 25 conductive for a desired interval of time, the length of which depends principally upon the setting of the adjustable resistance 90. The lockout circuit 91 operates to prevent the generation of a subsequent impulse in the following manner. The impulse of voltage generated by circuit 74 is impressed upon control member 104 of the electric valve 100 through capacitance 113 and resistance 114 so that electric valve 100 is rendered conductive, thereby charging the capacitance 98 through a circuit including the secondary winding of transformer 101, electric valve 102, electric valve 100 and contactor 106. The charge accumulated in capacitance 98 is of the polarity tending to overcome the effect of the negative biasing potential produced by capacitance 97 and renders the electric discharge device 92 conductive. When the electric discharge device 92 is rendered conductive, a negative potential is impressed on point 73 of the polarity selector 33 through a circuit including conductor 115, electric discharge device 92, contactor 117, switch 123 and conductor 125. This negative biasing potential prevents the discharge device of discharge devices 48 and 49 from being rendered conductive, and thereby prevents the initiation of a subsequent impulse. The circuit may be reset by closing contactor 108 which closes the discharge circuit for capacitance 98, and by closing contactor 119 which closes a circuit across the anode and cathode of electric discharge device 92, thereby rendering the discharge device nonconductive. The circuit is then in condition for a subsequent spot welding operation, which may be initiated by opening contactors 108 and 119.

It is to be noted that since the rectifier 99 is energized from the alternating current circuit 2, the charging of the capacitance 98 and hence the control of the electric discharge device 92 is substantially independent of the magnitude of the control voltage provided by circuit 74 and independent of the settings of circuits 33 and 74. Of course, the electric valve 100 is responsive to the number of impulses and the duration of the impulses generated by circuit 74.

Where it is desired to effect a predetermined number of consecutive energizations of the load circuit 1, as in interrupted-spot welding operations, the switches 122—124 are moved to the intermediate positions. The lockout circuit 91 is effectively connected in circuit for this operation, but the contactor 106 is maintained in the open circuit position so that the adjustable resistance 105 controls the rate at which the charge is established on capacitance 98. Contactor 85 is maintained in the closed position. The polarity selector 33 under this condition of operation controls the periodicity of the successive energizations of the load circuit 1, and also controls the time of initiation of the consecutive energizations. The voltage divider 126 may be adjusted to control the welding cycle, that is, to control the sum of the intervals of conduction and the intervals of nonconduction. In response to each impulse generated by the polarity selector 33, the circuit 74 generates a periodic voltage which controls the ratio of the intervals of conduction to the intervals of nonconduction of electric discharge device 25 in circuit 22, and hence controls the ratio of the intervals of conduction to the intervals of nonconduction of electric valves 4 and 5. When in the intermediate position, switch 124 may be utilized to connect the additional commutating capacitance 64 across the parallel paths of circuit 33. Since the resistance 105 is connected in series relation with capacitance 98, the rate at which the capacitance is charged is substantially less than that under spot welding operation so that the lockout circuit does not become effective until the desired number of impulses have been transmitted by the circuit 74. Upon the transmission of the desired number of impulses, electric discharge device 92 will be rendered conductive to impress a negative biasing potential on point 73 to prevent the generation of subsequent impulses, thereby effecting the desired number of periodic energizations of the load circuit 1 during the desired interval of time. Of course, it is to be understood that during the interrupted-spot welding operation the contactors 108 and 119 are in the open positions, and the contactor 85 and contactor 117 are in the closed circuit positions. To reset the circuit, contactor 108 is closed and contactor 85 is opened. Another series of energizations of circuit 1 may be initiated by opening contactors 108 and by closing contactors 117 and 85.

Where it is desired to effect periodic energization of the load circuit 1 continuously, the switches 122—124 are moved to the right-hand positions. This condition is sometimes defined as a seam welding operation and the lockout circuit 91 is not connected to the control system. The voltage divider 126 may be adjusted to control the welding cycle, that is, to control the sum of the periods of conduction to the periods of nonconduction, or, in other words, to control the periods of energization of the load circuit 1, and the resistance 90 may be adjusted to control the ratio of the intervals of conduction to the intervals of nonconduction. In addition, the rotary phase shifter 32 may be adjusted to control the amount of energy transmitted during each period of conduction of the electric valves 4 and 5.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, electric translating apparatus interposed therebetween and comprising an electric valve means having a control member, means for energizing said control member comprising a control circuit for generating an electrical quantity to render said electric valve means conductive during an interval of time of predetermined length, and lock-out means connected between said electric valve means and said control circuit for rendering said control circuit inoperative at the end of said interval and comprising an electric discharge device, means tending to maintain said discharge device nonconductive, a capacitance and a serially connected rectifier energized from said supply circuit and a controlled electric valve responsive to said electrical quantity for charging said capacitance to render said discharge device conductive.

2. In combination, an alternating current supply circuit, a load circuit, electric translating apparatus interposed therebetween and comprising an electric valve means having a control member, means for energizing said control member to render said electric valve means conductive during an interval of time of predetermined length and comprising an electric discharge device, said electric discharge device comprising a control electrode for controlling the conductivity thereof, and lock-out means connected between said electric valve means and said electric discharge device for rendering said discharge device nonconductive at the end of said interval and comprising a second electric discharge device, a control circuit tending to maintain said second discharge device nonconductive, a capacitance and a serially connected rectifier energized from said supply circuit and a controlled electric valve for charging said capacitance to render said second discharge device conductive in response to the conduction of said first mentioned electric discharge device.

3. In combination, an alternating current circuit, an electric discharge device having a control member, means for producing a timing voltage comprising a source of direct current, capacitance means to be charged from said source and an electric valve for discharging said capacitance, means for controlling the value of said capacitance means to control the period of said timing voltage, means for impressing on said control member a biasing potential tending to maintain said discharge device nonconductive, and means for rendering said discharge device conductive at the expiration of a predetermined interval of time comprising in series relation a second capacitance and a controlled electric valve responsive to said timing voltage for charging said second capacitance from said alternating current circuit during an interval of time established by said timing voltage.

4. In combination, an alternating current circuit, an electric discharge device having an anode, a cathode and a control member, means for impressing on said control member a biasing potential tending to maintain said discharge device nonconductive, means for impressing on said control member a potential in opposition to the first-mentioned potential to render said discharge device conductive comprising in series relation a capacitance, a rectifier energized from said alternating current circuit and an electric valve having a control member which is energized in response to a predetermined number of electrical impulses, and circuit interrupting means connected in the anode-cathode circuit of said electric discharge device for rendering said device nonconductive after the occurrence of said predetermined number of electrical impulses.

5. In combination, an alternating current circuit, an electric discharge device having an anode, a cathode and a control member, means for impressing on said control member a biasing potential tending to maintain said discharge device nonconductive, means for impressing on said control member a potential in opposition to the first-mentioned potential to render said discharge device conductive comprising in series relation a capacitance, a rectifier energized from said alternating current circuit and an electric valve having a control member which is energized in response to a predetermined number of electrical impulses, a discharge circuit for said capacitance, and circuit interrupting means connected in the anode-cathode circuit of said discharge device for rendering said discharge device nonconductive after the occurrence of said predetermined number of electrical impulses.

6. In combination, an alternating current circuit, an electric discharge device having an anode, a cathode and a control member, means for impressing on said control member a biasing potential tending to maintain said discharge device nonconductive, means for energizing said control member to render said discharge device conductive comprising in series relation a capacitance, a rectifier energized from said alternating current circuit and an electric valve having a control member which is energized in accordance with a predetermined controlling influence, a discharge circuit for said capacitance, a circuit connected across said anode and said cathode for rendering said electric discharge device nonconductive, and means for closing said discharge circuit and said last mentioned circuit.

7. In combination, an alternating current circuit, an electric discharge device having an anode, a cathode and a control member, means for impressing on said control member a biasing potential tending to maintain said discharge device nonconductive, means for energizing said control member to render said discharge device conductive comprising in series relation a capacitance, a rectifier energized from said alternating current circuit and an electric valve having a control member which is energized in accordance with a predetermined controlling influence for charging said capacitance, a discharge circuit for said capacitance comprising a normally closed contactor, contactor means connected in the anode-cathode circuit of said electric discharge device and being biased to maintain normally said discharge device in a nonconducting condition, means for opening the contactor in said discharge circuit and said contactor means to place said discharge device in condition for operation, and means for closing said discharge circuit and operating said contactor means to render said discharge device nonconductive.

8. In combination, an alternating current circuit, a source of direct current, a voltage divider connected across said source of direct current, means energized from said source of direct current for generating an electrical quantity and comprising an electric discharge device having a control member, means for energizing said control member to initiate the generation of said electrical quantity, a second electric discharge device for impressing on said control member a negative potential derived from said voltage divider to render the first mentioned discharge device nonconductive after the generation of said electrical quantity, said second discharge device including a control member for controlling the nonconductive, and means for impressing on the control member of said second discharge device a potential tending to maintain said device nonconductive, and means for impressing on the control member of said second discharge device a potential to render said device conductive comprising a capacitance, a rectifier energized from said alternating current circuit and being connected in series relation with said capacitance and a controlled electric valve connected in series relation with said rectifier for charging said capacitance in response to said quantity.

9. In combination, an alternating current circuit, an electric valve having a control member, means for impressing on said control member a periodic electrical quantity to render said electric valve means conductive periodically, means for maintaining said first mentioned means inoperative after the generation of a predetermined number of impulses of said periodic quantity comprising an electric discharge device having a control member, and means for energizing said control member to render said discharge device conductive and comprising a capacitance, a rectifier energized from said alternating current circuit and being connected in series relation with said capacitance and a controlled electric valve energized in response to said periodic electrical quantity for charging said capacitance.

10. In combination, an alternating current circuit, electric translating apparatus energized from said alternating current circuit, means for controlling the energization of said translating apparatus comprising an electric discharge device having a control member, means for generating a periodic electrical quantity and for controlling the times of initiation of the impulses of said electrical quantity, means responsive to said electrical quantity for controlling the length of the periods of conduction of said electric discharge device, a second electric discharge device for controlling the number of consecutive energizations of said translating apparatus, said second discharge device having a control member for controlling the conductivity thereof, means for impressing on the control member of said second electric discharge device a biasing potential tending to maintain said device nonconductive, and means comprising a controlled electric valve for energizing the control member to render said second electric discharge device conductive in response to said periodic electrical quantity.

11. In combination, an alternating current circuit, a load circuit, electric valve apparatus connected between said circuits for transmitting energy therebetween, a control system for controlling said electric valve apparatus comprising a timing circuit for generating a control voltage, a lockout circuit for determining the interval of time during which said load circuit is energized comprising an electric discharge device having a control member, means for impressing on said control member a biasing potential tending to maintain said discharge device nonconductive and a circuit for energizing said control member to render said discharge device conductive comprising in series relation a capacitance, a rectifier energized from said alternating current circuit and a controlled electric valve responsive to said control voltage for charging said capacitance, and means for presetting the control system to effect energization of said load circuit within a predetermined interval of time or to effect continued periodic energization of said load circuit comprising a switching means for selectively connecting and disconnecting the lockout circuit from the control system.

LOUIS G. LEVOY, Jr.

CERTIFICATE OF CORRECTION.

Patent No. 2,232,541. February 18, 1941.

LOUIS G. LEVOY, JR.

It is hereby certified that error appears in the printed specification of the above numbered patent requiring correction as follows: Page 8, first column, line 30, claim 8, for "nonconductive, and" read --conductivity thereof,--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.